United States Patent
Simmons

(10) Patent No.: US 12,349,654 B1
(45) Date of Patent: Jul. 8, 2025

(54) DOG TRAINING DEVICE

(71) Applicant: Benjamin Simmons, Florence, SC (US)

(72) Inventor: Benjamin Simmons, Florence, SC (US)

( * ) Notice: Subject to any disclaimer, the term of this patent is extended or adjusted under 35 U.S.C. 154(b) by 223 days.

(21) Appl. No.: 18/118,837

(22) Filed: Mar. 8, 2023

(51) Int. Cl.
 *A01K 15/02* (2006.01)
(52) U.S. Cl.
 CPC ................................. *A01K 15/02* (2013.01)
(58) Field of Classification Search
 CPC ................................. A01K 15/02; A63B 69/34
 See application file for complete search history.

(56) References Cited

U.S. PATENT DOCUMENTS

| | | | | |
|---|---|---|---|---|
| 4,088,315 A | * | 5/1978 | Schemmel | G01G 19/52 482/84 |
| 4,168,062 A | * | 9/1979 | McCarthy | A63B 63/06 473/446 |
| 4,304,194 A | * | 12/1981 | Boykin, II | A01K 1/0029 119/51.04 |
| 5,772,538 A | * | 6/1998 | Sztykiel | A63B 63/00 473/446 |
| 5,911,197 A | * | 6/1999 | Schmid | A41D 13/08 2/2.5 |
| 6,155,960 A | * | 12/2000 | Roberts | A63B 69/34 482/90 |
| 6,721,959 B1 | * | 4/2004 | Hairston | A41D 13/08 2/16 |
| 9,789,375 B2 | * | 10/2017 | Salerno | A63B 69/22 |
| 10,602,791 B2 | * | 3/2020 | Jur | A41D 13/02 |
| 11,305,167 B2 | * | 4/2022 | Czarnecki | A63B 69/34 |
| 12,138,518 B1 | * | 11/2024 | Gilman | A63B 69/34 |
| 2010/0083911 A1 | * | 4/2010 | Gardner | A01K 15/02 119/856 |
| 2011/0172060 A1 | * | 7/2011 | Morales | A63B 69/0053 482/8 |

* cited by examiner

*Primary Examiner* — Michael H Wang
(74) *Attorney, Agent, or Firm* — Sanchelima & Associates, P.A.; Jesus Sanchelima; Christian Sanchelima

(57) ABSTRACT

A dog training device including a dummy assembly, an arm assembly, an internal assembly and a track assembly. The dummy assembly includes a dummy. The dummy is removable attached to the internal assembly. The dummy is a plastic replica of a human torso. The arm assembly includes a movable arm. The movable arm can perform a plurality of movements. The movable arm is covered with a bite sleeve to perform dog training. The internal assembly is configured to slide over said track assembly. The track assembly is fixed to the ground.

2 Claims, 10 Drawing Sheets

DOG TRAINING DEVICE

BACKGROUND OF THE INVENTION

1. Field of the Invention

The present invention relates to a dog training device and, more particularly, to a dog training dummy that allows practicing of bites and hits of a dog with a dummy having movable extremities for performing canine training movements.

2. Description of the Related Art

Several designs for training dummies have been designed in the past. None of them, however, include a replaceable plastic-like dummy.

Applicant believes that a related reference corresponds to U.S. Pat. No. 9,789,375 issued for a training apparatus including a mannequin. Applicant believes that another related reference corresponds to U.S. Pat. No. 5,911,197 issued for a canine training device that protects a helper's hand and arm while training a dog to bite and hold the arm of a human. None of these references, however, teach of a dog training device comprising a modular training dummy having a base with a vertical support having multiple mounting apertures, a human torso simulating cover and a pair of repositionable limbs which are removably attachable to the post and torso.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a dog training device that includes a movable arm which may be articulated in different predetermined configurations which allows the dog to practice bites for the different configurations, where the different configurations may include an standoff configuration, a recall configuration and an attack configuration.

It is another object of this invention to provide a dog training device that includes multiple shock absorbers to allow the movable parts to support effort produced by the dog pulling, pushing or biting.

It is another object of this invention to provide a dog training device that includes a removable bite sleeve which can be attached to a movable arm, where the bite sleeve is designed to be bitten by the dog.

It is another object of this invention to provide a dog training device that enhances protection of a user for dog training.

It is another object of this invention to provide a dog training device that includes a track to allow moving the dummy back and forth.

It is still another object of the present invention to provide a dog training device that includes a base having multiple attaching means to prevent the dog training device from moving from an anchor point.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
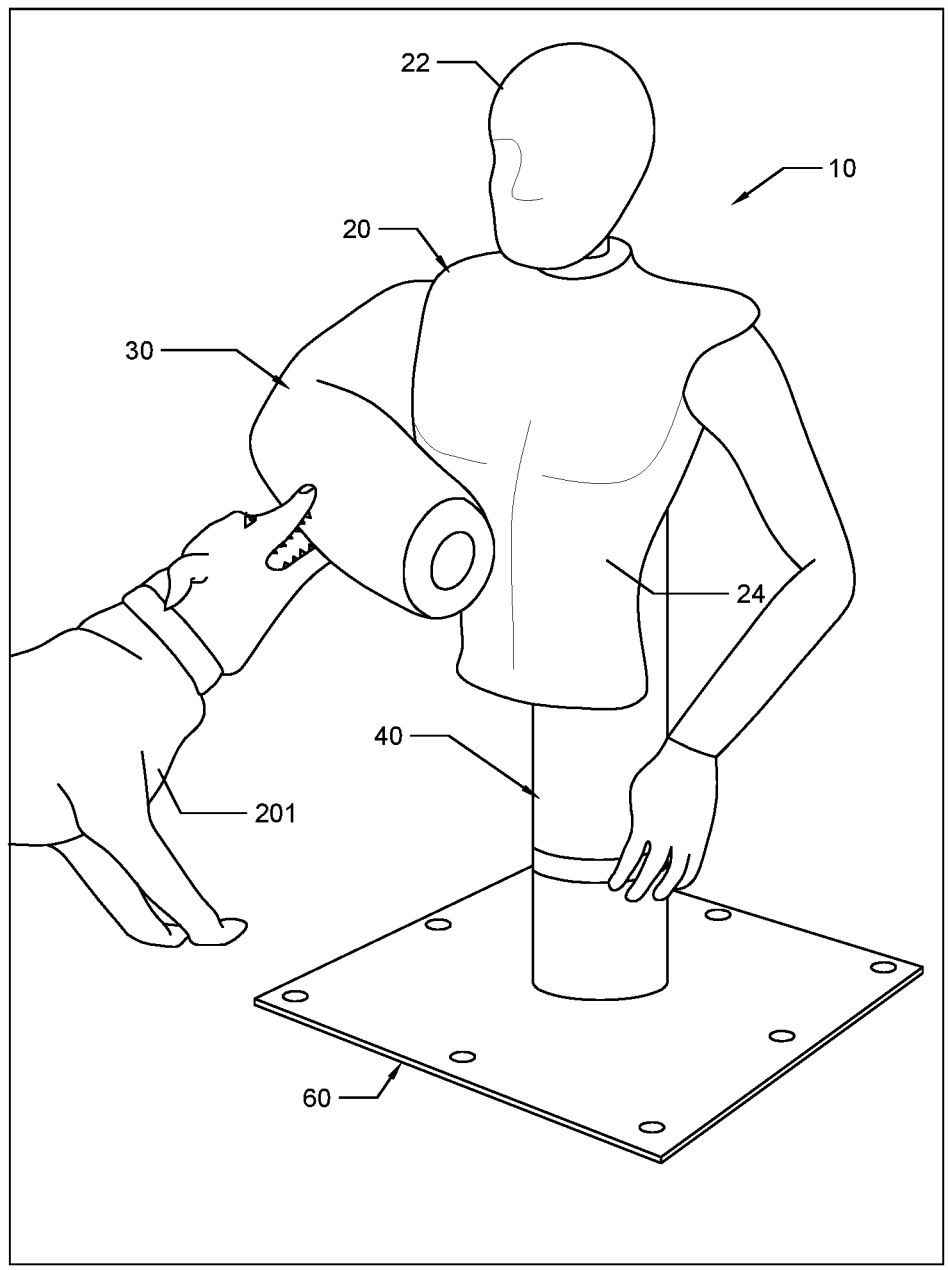
FIG. 1 represents an isometric operational view of the present invention 10 being bitten by dog 201. The present invention includes a dummy assembly 20, an arm assembly 30, an internal assembly 40, an arm assembly 30, a base assembly 60, and a track assembly 80.

Referring now to the drawings, where the present invention is generally referred to with numeral 10, it can be observed that it basically includes a dummy assembly 20, an arm assembly 30, an internal assembly 40, an arm assembly 30, a base assembly 60, and a track assembly 80. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

As best illustrated in FIG. 1 the dummy assembly 20 may include a dummy 22 having a central portion 24 and prong 26s. In a preferred embodiment the dummy 22 may be made of a rubber-like material. It also may be suitable for the dummy 22 to be made of wood, fiberglass, silicone, or any other suitable material. The dummy 22 may conform with the shape of a human torso. The dummy 22 may have a left or right arm. The rear portion of the dummy 22 may be planar. The rear portion of the dummy 22 may include prongs 26. Prongs 26 are protruding members having a cylindrical shape which allows attaching the dummy 22 to the internal assembly 40.

Figure 7:
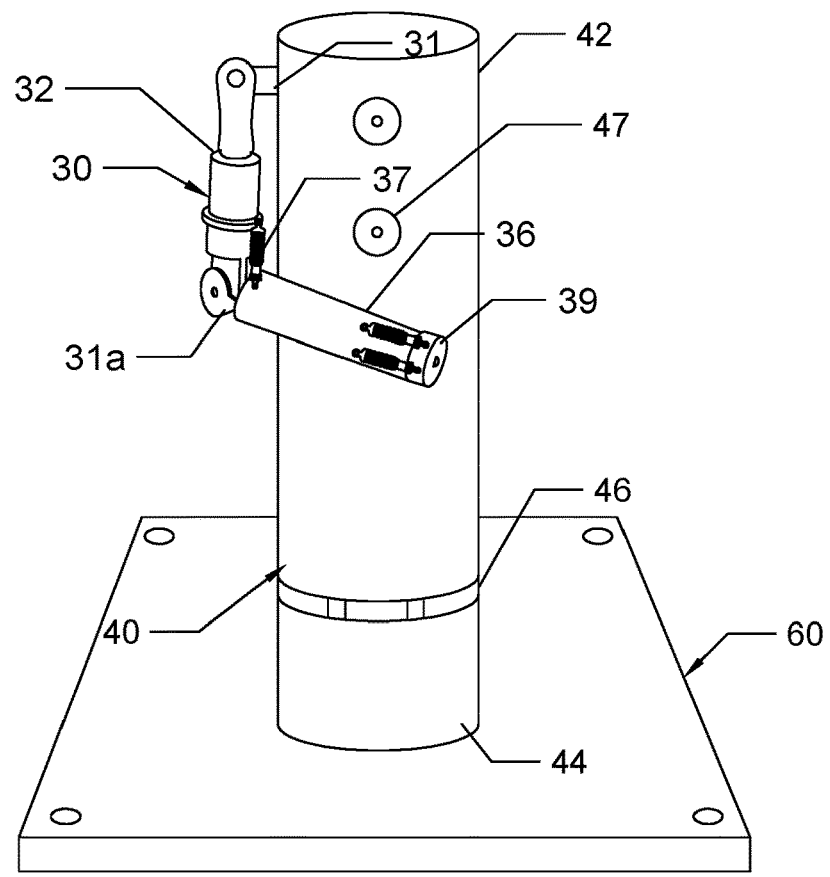
FIG. 7 represents a front view of the internal assembly 40 having the arm 30 in a predetermined position 30.
Figure 8:
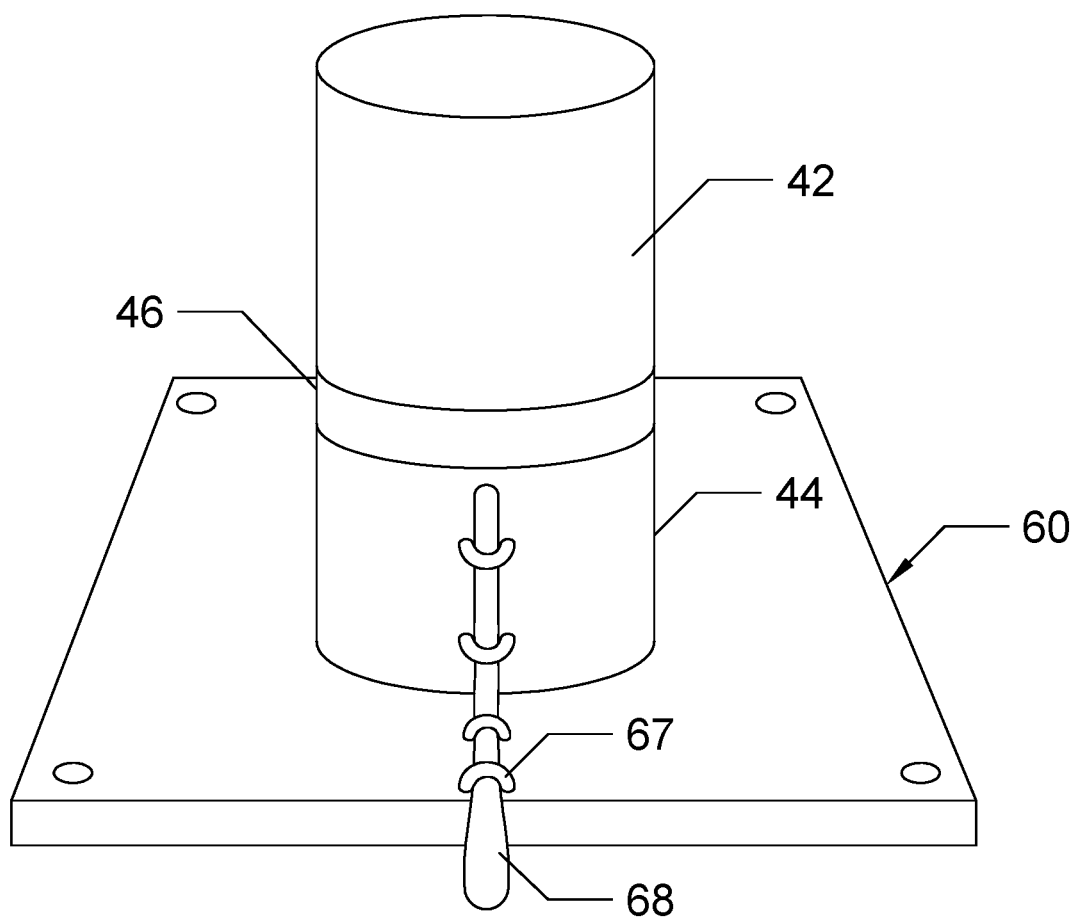
FIG. 8 shows a rear enlarged view of the base assembly 60.
Figure 9:
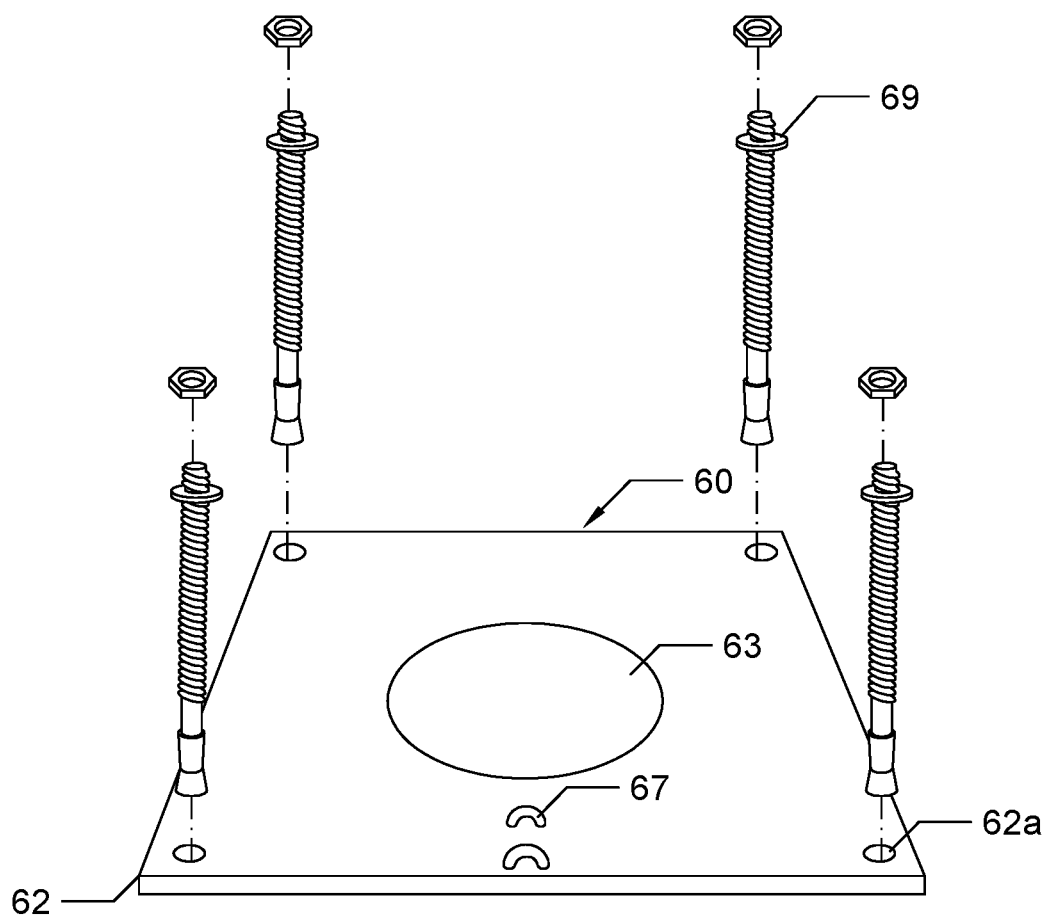
FIG. 9 depicts an exploded view of the base assembly 60 including anchors 69.
Figure 10:
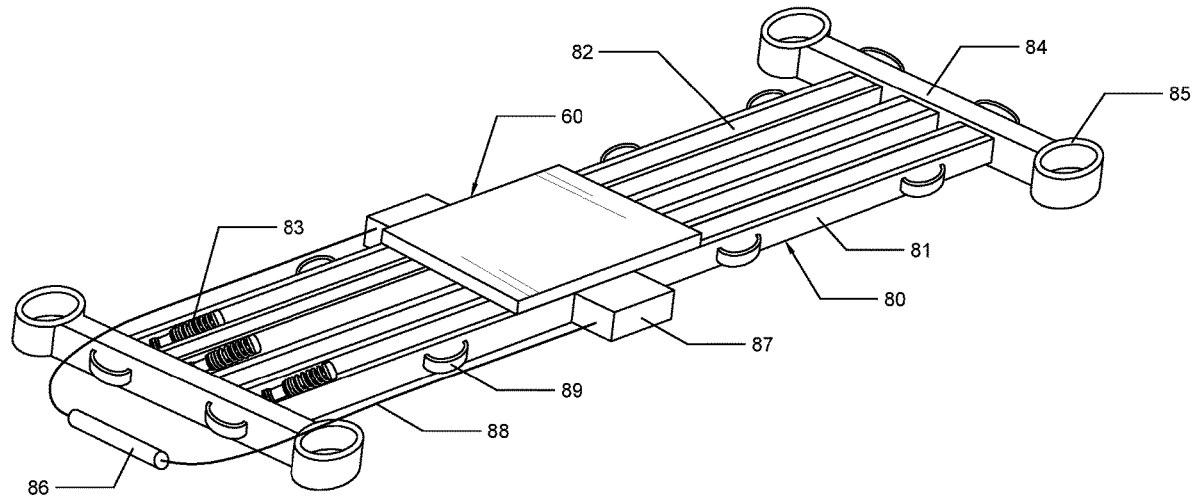
FIG. 10 shows an isometric view of a track assembly 80.

Referring now to FIG. 7 it can be observed that the internal assembly 40 may include a column 42, receiving members 47, a spring portion 46 and a bottom portion 44. In a preferred embodiment the column 42 and the base portion 44 may be made of stainless steel, aluminum, fiberglass, or any other resistant material. The column 42 and the base portion 44 may have such a height that conforms with an average height of 160 to 170 cm. The column 42 may be a solid cylindrical element. The base portion 44 may be hollow. The receiving members 47 may be located on a central front portion of column 42. The receiving members 47 may be circular openings partially extending through column 42. The prongs 26 may be coupled within the receiving member 47. It should be understood that prongs 26-receiving members 47 may be adapted to be fixed therebetween.

Figure 6:
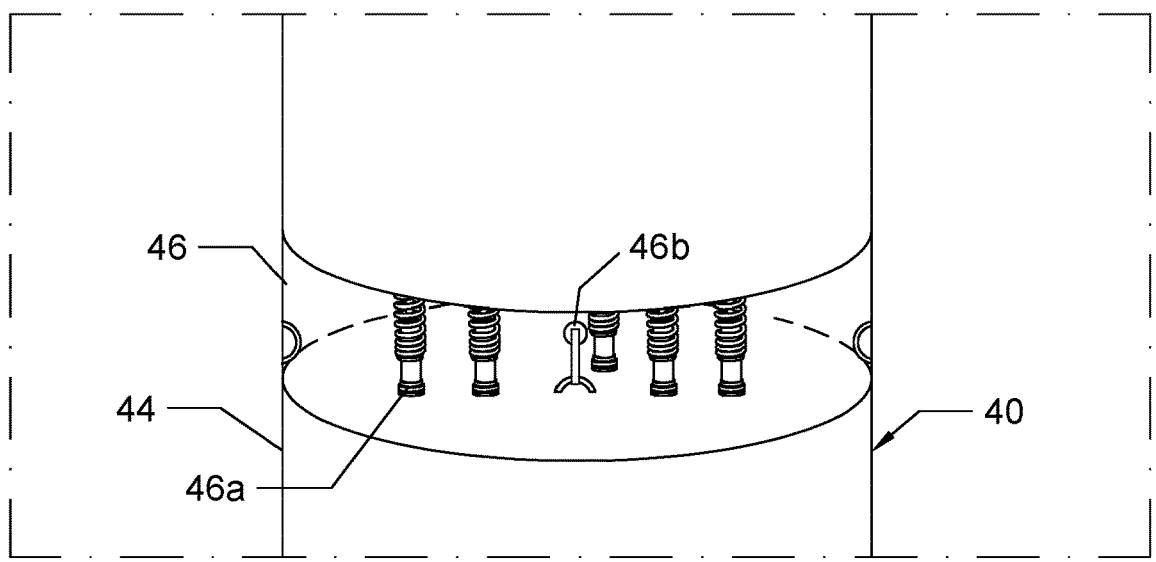
FIG. 6 depicts an enlarged see-through view of the spring portion 46.

As best illustrated in FIG. 6 the spring portion 46 may include springs 46a and a swivel element 46b. The springs 46a may be coil springs disposed within the spring portion 46 to allow swivel of the column 42. The swivel element 46b may be located on a front portion of the spring portion 46 connecting a top and a bottom of the spring portion. It should be understood that the spring portion 46 may be made of a flexible material. The swivel element 46b may allow swiveling the spring portion in a predetermined range. The bottom portion 44 may be connected to the base assembly 60. In a preferred embodiment the bottom portion 44 may be coupled to the base assembly 60 by welding it thereto or by means of a plurality of fasteners. The arm assembly 30 may be coupled to the left or right top portion of column 42. In one embodiment the present invention 10 may include a motor 53, a battery 51 and a microcontroller 52 actuated together to measure impacts made to the column 42 or to actuate movement of the arm assembly 30.

Figure 3:
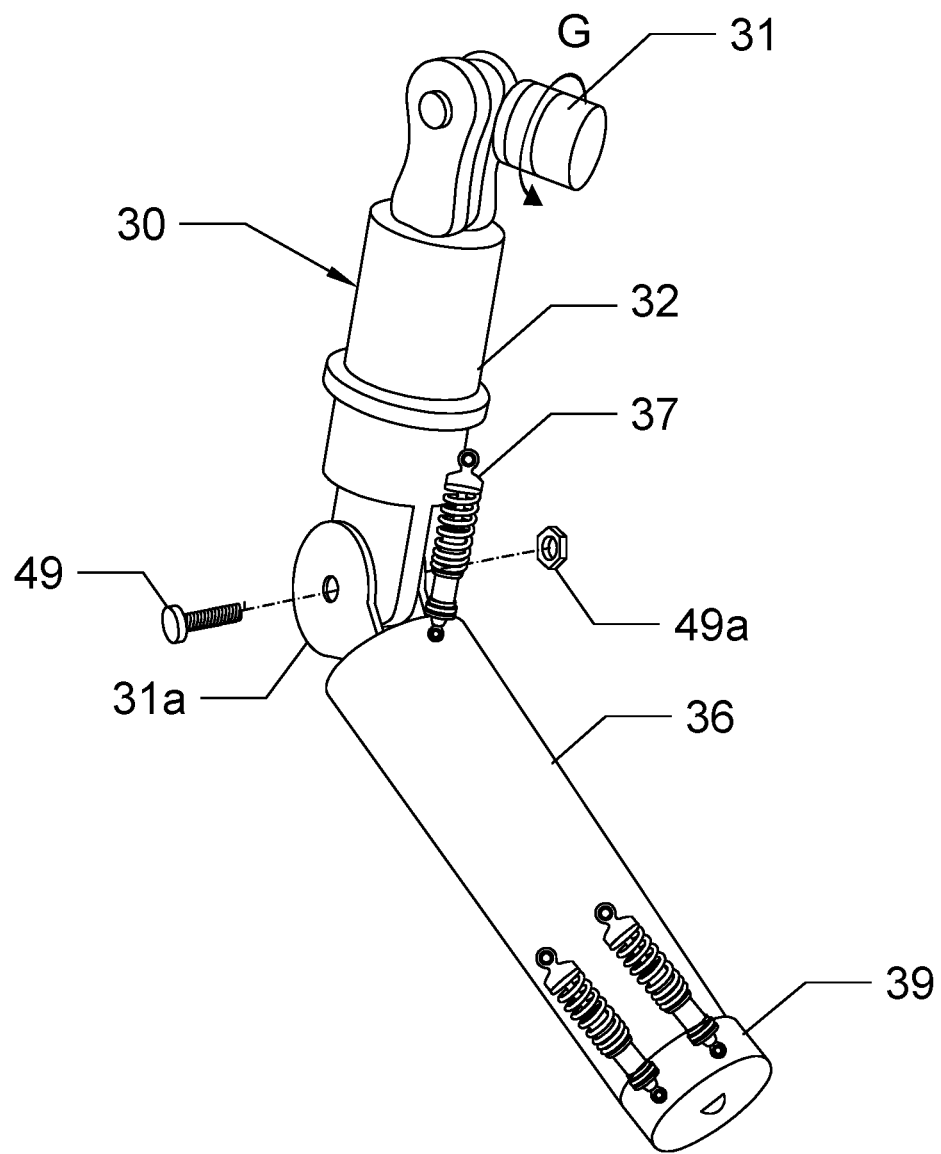
FIG. 3 illustrates an isometric view of the arm assembly 30.

As best illustrated in FIG. 3 the arm assembly 30 may include a major arm 32 a mechanical shoulder 31, a bite sleeve 35, a female member 31a, shock absorbers 37, a joint 49, a minor arm 36 and a mechanical wrist 39. The arm assembly 30 may preferably be made of stainless steel. It also may be suitable for the arm assembly 30 to be made of aluminum, copper, glass fiber, or any other resistant material. The major arm 32 may include a distal end and a proximal end. The proximal end of the major arm 32 may have an U-shaped element having an opening, where the U-shelement may be rotatably coupled to the mechanical shoulder 31. The U-shaped element of the major arm 32 may substantially have a cylindrical shape. It also may be suitable for the major arm 32 to have a rectangular shape, a triangular shape, or any other suitable shape. The U-shaped element of the major arm 32 may rotate up and down with respect to the mechanical shoulder 31. The mechanical shoulder 31 may be removable attached to a top side portion of column 42. The mechanical shoulder 31 may be adapted to rotate over its own axis (movement G), defining a mechanical shoulder 31 with two degrees of freedom.

The distal end of the major arm 32 may include a male member. The minor arm 36 may include a proximal end and a distal end. The proximal end of the minor arm 36 may include the female member 31a. The distal end of the minor arm 36 may be coupled to the mechanical wrist 39. The male member of the major arm 32 and the female member 31 of the minor arm 36 may be rotatably coupled together by means of the joint 49. The joint 49 may include a nut 49a. The minor arm 36 may substantially have a cylindrical shape, it also may be suitable for the minor arm 36 to have a rectangular shape, a triangular shape, or any other suitable shape. The major arm 32 and the minor arm 36 may further be connected by means of a first shock absorber of the shock absorbers 37.

Figure 4:
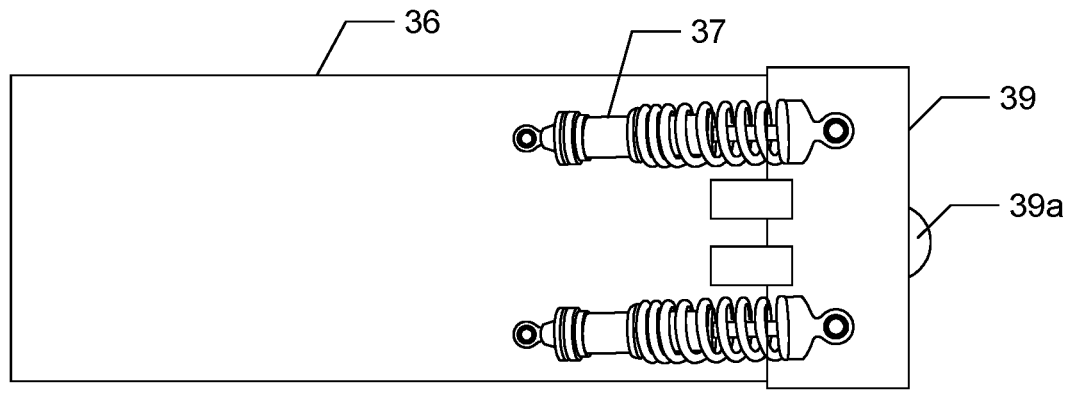
FIG. 4 is a representation of an enlarged top view of the hand holder 39.
Figure 5:
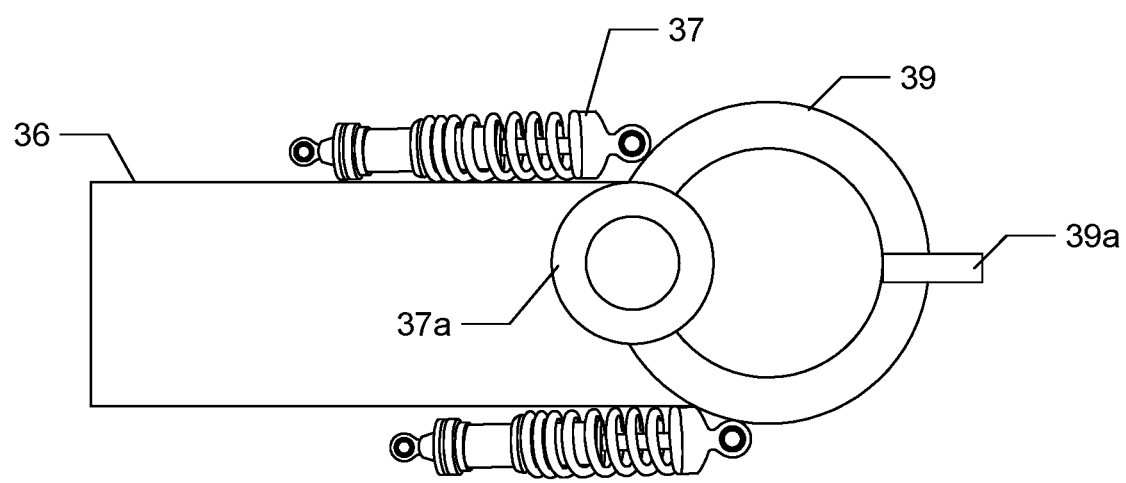
FIG. 5 shows a side view of the hand holder 39.

The mechanical wrist 39 may be rotatably attached to the distal end of the minor arm 36. The mechanical wrist 39 may substantially have a cylindrical shape. It also may be suitable for the mechanical wrist 39 to have a rectangular shape, a triangular shape, or any other suitable shape. The mechanical wrist 39 may be connected with at least a second shock absorber of the shock absorbers 37. Shock absorbers 27 may dampen shock in joints of the arm assembly 30 produced by a hit thereto. As best illustrated in FIG. 4 and FIG. 5, the mechanical wrist 39 may include a junction member 37a which connected the minor arm 36 with the mechanical wrist 39. The mechanical wrist 39 includes an attaching member 39a. In a first embodiment illustrated in FIG. 4 the attaching member 39a may be a magnet member to hold a predetermined metallic element. In a second embodiment illustrated in FIG. 5 the attaching member 39a is a nut for attaching a predetermined element thereto.

The base assembly 60 may include a base 62, openings 62a, hammer driven anchors 69, a central portion 63, holders 67, a cord 68, a bottom portion 64, and wheels 71. The base 62 may have a rectangular shape. It also may be suitable for the base 62 to have a circular shape, a triangular shape, or any other suitable shape. The base 62 may be made of stainless steel. It also may be suitable for the base 62 to be made of titanium, aluminum, or any other resistant material. The openings 62a may transversely go through the base 62. The openings 62a may be used to introduce the hammer driven anchors 69 to fix the base 62 to ground. The openings 62a may be equidistantly disposed on the base 62.

Figure 2:
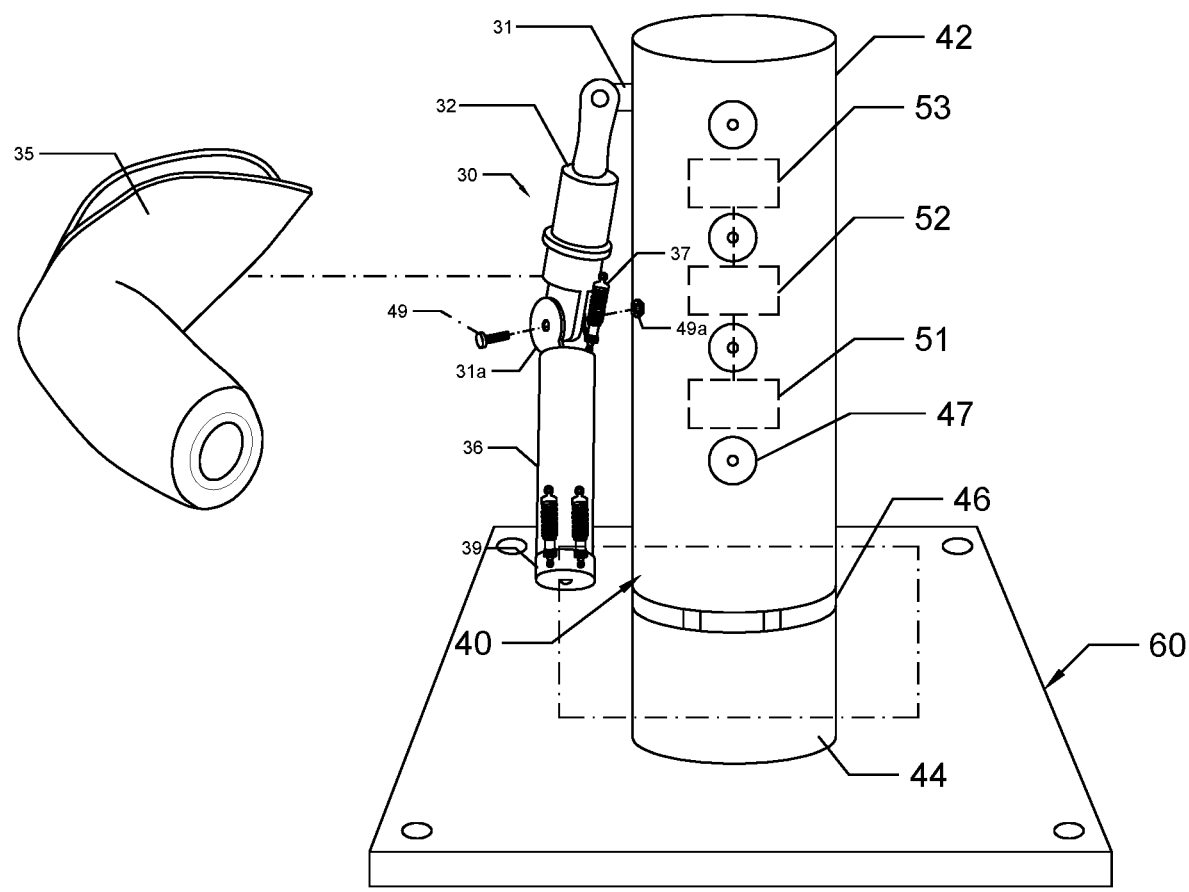
FIG. 2 shows an isometric view of the internal assembly 40.

The holders 67 may have a ring shape. The holders 67 may be welded in the base 62 to prevent movement of the cord 68. The cord 68 may be operatively connected to the arm assembly 30. The cord 68 may be pulled so the arm can move from a stand off position of the arm assembly 30 illustrated in FIG. 2 to an attack position of the arm assembly 30 illustrated in FIG. 7 and vice versa.

Figure 11:
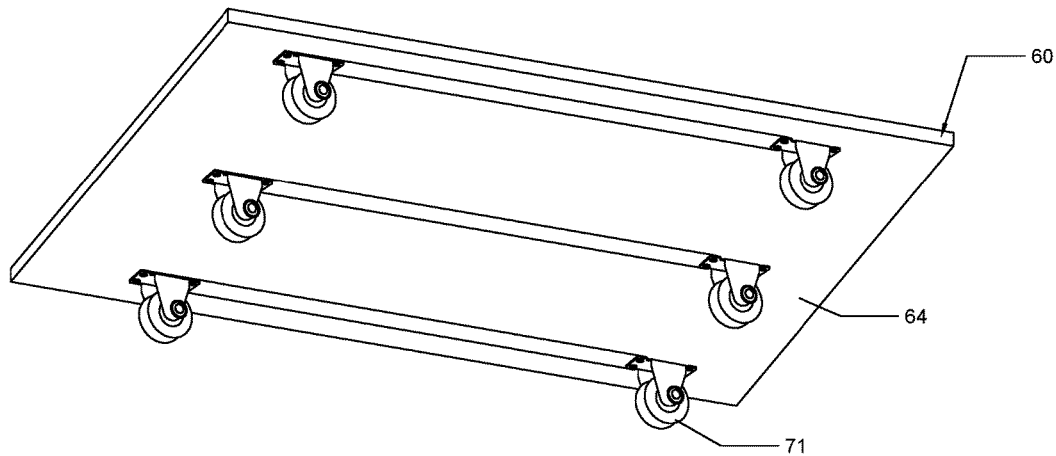
FIG. 11 depicts a bottom perspective view of the base assembly 60 having wheels 71, wheels 71 are coupled into channels 82 to slide the base assembly 60 along the track assembly 80.
Figure 12:
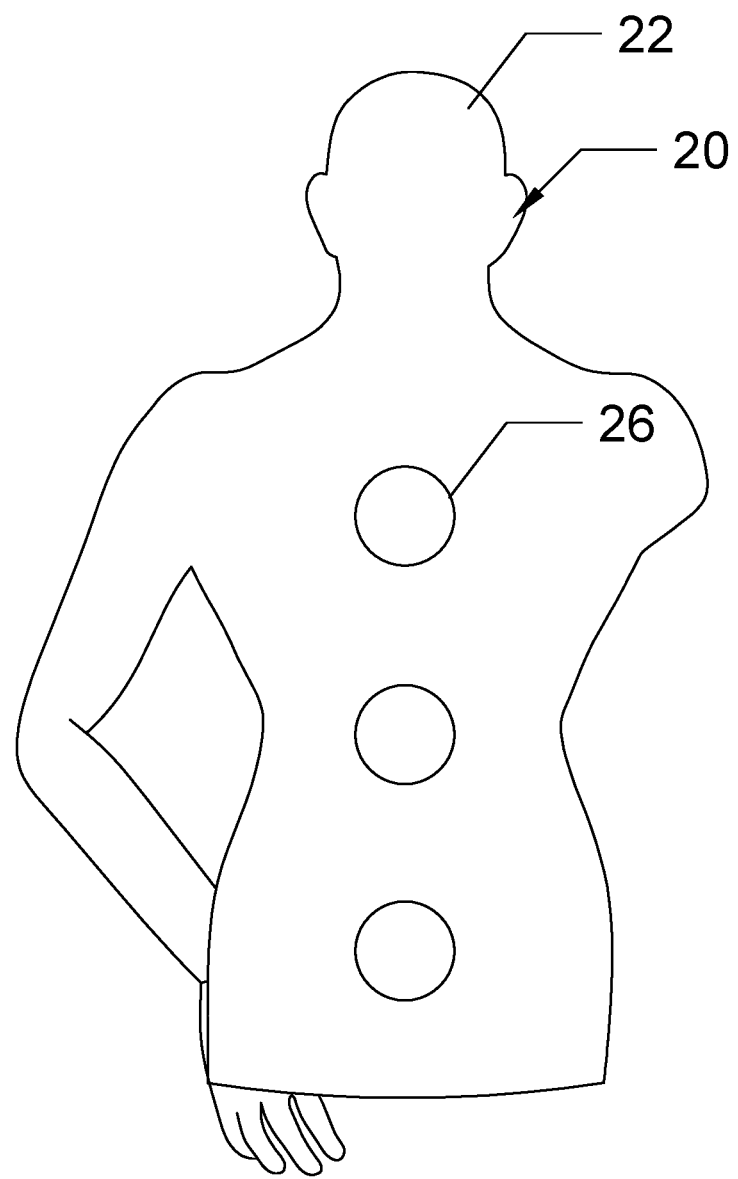
FIG. 12 represents a rear view of the dummy assembly 20.

Referring now to FIG. 11 it can be observed that the bottom portion of the base 62 may include the wheels 71. The wheels 71 are coupled within the track assembly 80. The wheels 71 may allow the base 62 to move along the track assembly 80. The wheels 71 may be made of stainless steel, aluminum, or any other suitable material.

Referring now to the track assembly 80 it can be observed that includes channels 82, transversal bars 84, first holders 89, second holders 85, actuating members 83, an actuation member 88, and an actuation mechanism 87. The channels 82 may be channels defined by a bottom wall, a left wall and a right wall. The channels 82 may be made of stainless steel, aluminum, or any other resistant material. The wheels 71 may slide through the channels 82. The transversal bars 84 may be located on the distal end and proximal end of the channels 82. The transversal bars 84 may be made of stainless steel, aluminum, or any other suitable material. The first holders 89 may have a ring-like shape. The first holders 89 may preferably be attached to the sides of the channels 82. The second holders 85 may have a ring shape. The second holders 85 may be attached to the transversal bars 84. The second holders 85 and the first holders 89 may be used to fix the track assembly 80 to ground.

The actuation member 88 may include an actuation cord connected to actuation mechanism 87. Actuation mechanism 87 may actuate the actuating members 83 to push the base 62 to slide through channels 82. The actuating members 83 are linear actuators placed within the channels 82. It also may be suitable to use a motor to slide the base 62 along the channels 82.

Figure 1A:
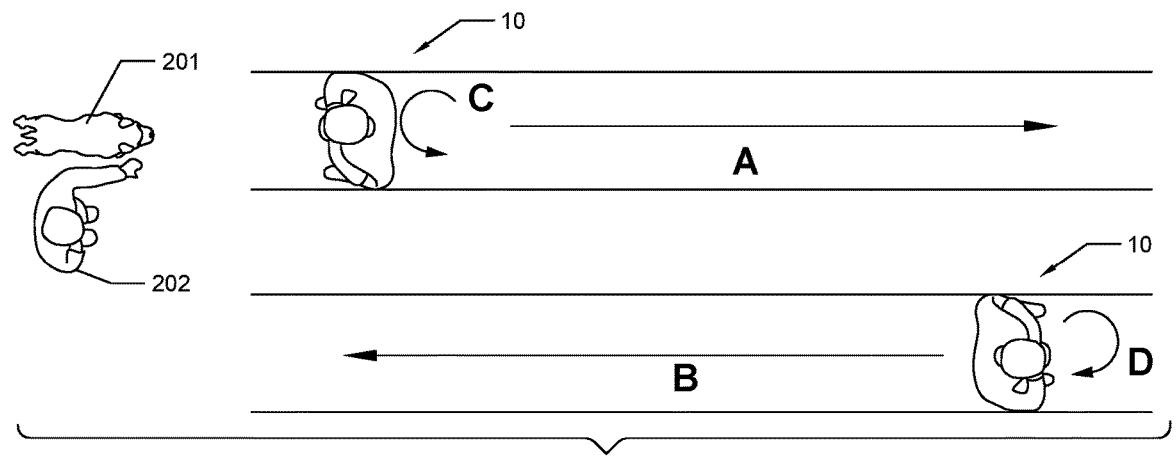
FIG. 1A represents a schematic operational view of the present invention 10 in a standoff configuration.

Referring now to FIG. 1A where an illustrative embodiment of the stand off is illustrated it can be observed that the present invention 10 may perform backwards movement C and slide performing movement A. The present invention 10 may perform a second backwards movement D and slide back performing movement B.

Figure 1B:
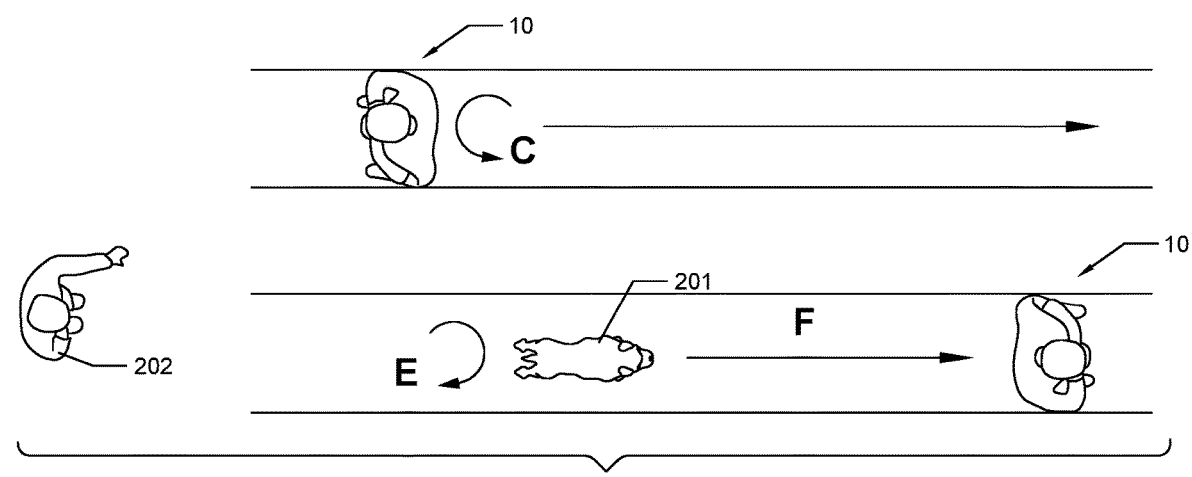
FIG. 1B represents a schematic operational view of the present invention 10 in a recall configuration.

In FIG. 1B illustrates a recall configuration, where the present invention 10 performs movement C and movement A while dog 201 is indicated by trainer 202 to run to the present invention 10 performing movement F and turn back E.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A dog training device, comprising:
   a dummy assembly, wherein said dummy assembly includes a plastic dummy, wherein said dummy is a replica of a human torso;
   an arm assembly, wherein said arm assembly includes a movable arm, wherein said movable arm includes a major arm and a minor arm coupled together by means of a mechanical elbow, wherein said movable arm includes a mechanical shoulder on a proximal end thereof, wherein said mechanical shoulder has at least two degrees of freedom;
   an internal assembly, wherein said internal assembly includes a column, wherein said dummy is removably attached to a front portion of said column, wherein said movable arm is attached to a top side of the column;
   a track assembly wherein said track assembly includes channels; and
   a base assembly, wherein said base assembly is removably attached to a bottom portion of said column, wherein said base assembly includes wheels in a bottommost end thereof, wherein said wheels are introduced within said channels, wherein said column is configured to slide through said channels by means of said base, wherein said base includes a cord, said cord extends through said column, said cord is operatively connected to said arm, wherein said cord is pulled to move said arm to a predetermined position.

2. A dog training device, consisting of:
   a dummy assembly, wherein said dummy assembly includes a plastic dummy, wherein said dummy is a replica of a human torso, said dummy includes prongs in a bottom portion thereof, wherein said column includes receiving members, wherein said prongs are inserted into said receiving members to be coupled therein, wherein said rear portion;
   an arm assembly, wherein said arm assembly includes a movable arm, wherein said movable arm includes shock absorbers, a mechanical shoulder, and major arm and a minor arm coupled together by means of a mechanical elbow, wherein said mechanical shoulder is located on a proximal end thereof, wherein said mechanical shoulder has at least two degrees of freedom, wherein said shock absorbers dampen hits applied to said movable arm, wherein said movable arm is configured to be covered by a bite sleeve to perform a dog training;
   an internal assembly, wherein said internal assembly includes a column, wherein said dummy is removably attached to a front portion of said column, wherein said movable arm is attached to a top side of the column, wherein said column includes at least one coil spring within a bottom portion of said column;
   a track assembly wherein said track assembly includes channels, actuating members, holders and an actuation member; and
   a base assembly, wherein said base assembly is removably attached to a bottom portion of said column, wherein said base assembly includes wheels in a bottommost end thereof, wherein said wheels are introduced within said channels, wherein said column is configured to slide through said channels by means of said base, wherein said base includes a cord, said cord extends through said column, said cord is operatively connected to said arm, wherein said cord is pulled to move said arm to a predetermined position, wherein said actuation member is pulled to actuate said actuating members to slide said wheels through said channels, wherein said holders are disposed on the sides of said channels, wherein said holders are configured to receive fasteners therein to attach the track assembly to ground.

* * * * *